US012272174B2

(12) United States Patent
Yuan Kuo et al.

(10) Patent No.: US 12,272,174 B2
(45) Date of Patent: Apr. 8, 2025

(54) QUANTIFYING USER ENGAGEMENT WITH A MEDIA ITEM

(71) Applicant: AT&T Intellectual Property I, L.P., Atlanta, GA (US)

(72) Inventors: Calvin Yuan Kuo, Boonton, NJ (US); Devan Patel, Cedar Grove, NJ (US); Meghan Vannieuwland, Sparta, NJ (US); Roque Rios, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 387 days.

(21) Appl. No.: 17/661,914

(22) Filed: May 3, 2022

(65) Prior Publication Data
US 2023/0360431 A1 Nov. 9, 2023

(51) Int. Cl.
*G06V 40/16* (2022.01)
*G06V 20/52* (2022.01)
*G06V 40/18* (2022.01)
*G06V 40/19* (2022.01)

(52) U.S. Cl.
CPC ............ *G06V 40/168* (2022.01); *G06V 20/52* (2022.01); *G06V 40/172* (2022.01); *G06V 40/19* (2022.01); *G06V 40/193* (2022.01)

(58) Field of Classification Search
USPC ........................................................ 382/103
See application file for complete search history.

(56) References Cited

U.S. PATENT DOCUMENTS

| | | | |
|---|---|---|---|
| 2013/0283162 A1* | 10/2013 | Aronsson | G11B 27/105 715/719 |
| 2015/0350727 A1* | 12/2015 | Gibbon | H04N 21/26291 725/12 |
| 2022/0167052 A1* | 5/2022 | Patel | H04N 21/44224 |
| 2022/0201369 A1* | 6/2022 | McClendon | H04N 21/234345 |

* cited by examiner

*Primary Examiner* — Jacky X Zheng

(57) ABSTRACT

For example, a method includes obtaining sensor data depicting movements of facial features of a user who is present in a location in which a media item is being presented, calculating, using the sensor data, an alertness score for the user, determining the alertness score falls below a predefined threshold alertness score, starting, in response to determining that the alertness score falls below the predefined threshold alertness score, a timer while continuing to calculate the alertness score for the user using newly obtained sensor data, determining that the alertness score for the user using the newly obtained sensor data has failed to meet the predefined threshold alertness score before an expiration of the timer, and taking, in response to the alertness score for the user using the newly obtained sensor data failing to meet the predefined threshold score before expiration of the timer, an action associated with the media item.

20 Claims, 3 Drawing Sheets

QUANTIFYING USER ENGAGEMENT WITH A MEDIA ITEM

The present disclosure relates generally to systems for streaming media, and relates more particularly to devices, non-transitory computer-readable media, and methods for quantifying user engagement with a media item being presented.

BACKGROUND

Streaming media platforms, including platforms that stream video, music, podcasts, and other types of media, provide users with a means of consuming media on demand. That is, users may play a media on a streaming platform whenever they choose, and potentially from wherever they choose as long as there is access to an Internet connected device. The convenience of streaming media has made it popular among users, which in turn has given rise to an ever increasing number of platforms through which users may consume different types of media.

SUMMARY

In one example, the present disclosure describes a device, computer-readable medium, and method for quantifying user engagement with a media item being presented based on movements of a user's facial features. For instance, in one example, a method includes obtaining sensor data depicting movements of facial features of a user who is present in a location in which a media item is being presented, calculating, using the sensor data, an alertness score for the user, determining the alertness score falls below a predefined threshold alertness score, starting, in response to determining that the alertness score falls below the predefined threshold alertness score, a timer while continuing to calculate the alertness score for the user using newly obtained sensor data, determining that the alertness score for the user using the newly obtained sensor data has failed to meet the predefined threshold alertness score before an expiration of the timer, and taking, in response to the alertness score for the user using the newly obtained sensor data failing to meet the predefined threshold score before expiration of the timer, an action associated with the media item.

In another example, a non-transitory computer-readable medium stores instructions which, when executed by a processor, cause the processor to perform operations. The operations include obtaining sensor data depicting movements of facial features of a user who is present in a location in which a media item is being presented, calculating, using the sensor data, an alertness score for the user, determining the alertness score falls below a predefined threshold alertness score, starting, in response to determining that the alertness score falls below the predefined threshold alertness score, a timer while continuing to calculate the alertness score for the user using newly obtained sensor data, determining that the alertness score for the user using the newly obtained sensor data has failed to meet the predefined threshold alertness score before an expiration of the timer, and taking, in response to the alertness score for the user using the newly obtained sensor data failing to meet the predefined threshold score before expiration of the timer, an action associated with the media item.

In another example, a device includes a processor and a computer-readable medium storing instructions which, when executed by the processor, cause the processor to perform operations. The operations include obtaining sensor data depicting movements of facial features of a user who is present in a location in which a media item is being presented, calculating, using the sensor data, an alertness score for the user, determining the alertness score falls below a predefined threshold alertness score, starting, in response to determining that the alertness score falls below the predefined threshold alertness score, a timer while continuing to calculate the alertness score for the user using newly obtained sensor data, determining that the alertness score for the user using the newly obtained sensor data has failed to meet the predefined threshold alertness score before an expiration of the timer, and taking, in response to the alertness score for the user using the newly obtained sensor data failing to meet the predefined threshold score before expiration of the timer, an action associated with the media item.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
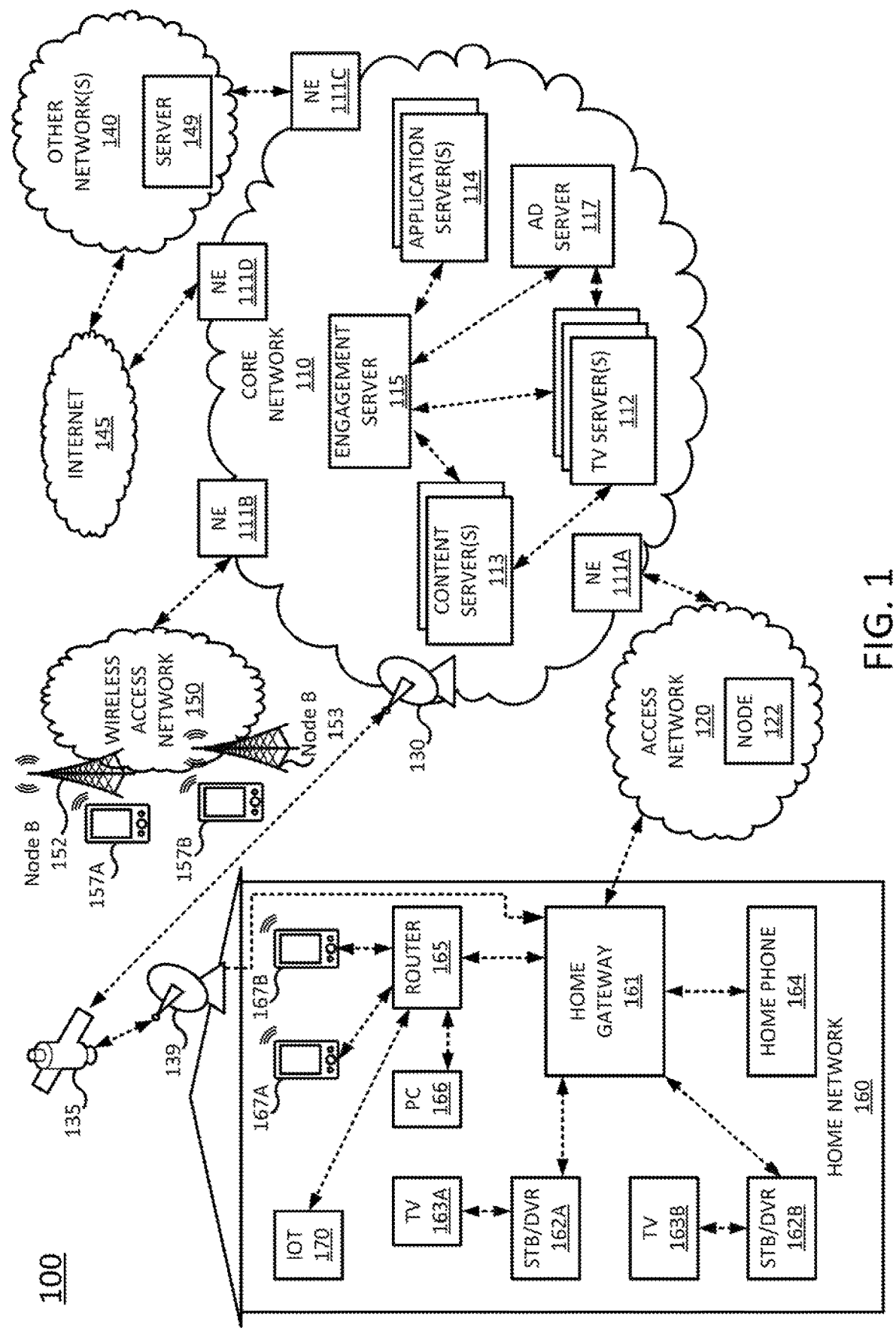
FIG. 1 illustrates an example network related to the present disclosure.

In one example, the present disclosure quantifies user engagement with a media item that is being presented, such as a media item that is being presented over a streaming media platform. As discussed above, streaming media platforms, including platforms that stream video, music, podcasts, and other types of media, provide users with a means of consuming media on demand. That is, users may play a media on a streaming platform whenever they choose, and potentially from wherever they choose as long as there is access to an Internet connected device. The convenience of streaming media has made these platforms popular among users, which in turn has given rise to an ever increasing number of platforms through which users may consume different types of media.

As the number of streaming media platforms increases, so does competition for subscribers. Most users do not want to subscribe to and pay separate fees for more than a select number of streaming services. Thus, providers of streaming media platforms often look for ways to enhance the overall streaming experience and set their platforms apart from the others as a means of attracting and retaining subscribers. One key way to set a streaming media platform apart and to enhance the streaming experience is to provide content that is most likely to engage users, such as an exclusive or popular television series or podcast. The most engaging content is also typically the most lucrative for streaming media platforms that include advertising, as advertisers are often willing to pay a premium to advertise their goods and services during times when users are most likely to be engaged and paying attention.

Many streaming media platforms use analytics to determine which content is most engaging for users. For instance, these analytics may reflect the number of times a particular media item was played (e.g., how many times a podcast episode was listened to) by individual users, an average length of time for which users played a particular media item (e.g., whether users tend to finish a television episode or tune out part way through), a number of repeat plays of a particular media item (e.g., a number of repeat viewings of a movie by the same user), a user rating for a particular media item (e.g., a cumulative score for a movie based on individual user scores), and/or other metrics.

One problem with typical engagement metrics, however, is that most of these metrics do not necessarily reflect actual user engagement with the media item. For instance, an engagement metric may indicate that User A played Movie X on their tablet computer from start to finish. However, User A may not have been engaged with or actively paying attention to Movie X for the entire time that Movie X was playing. As an example, User A may have simply put Movie X on in the background while he or she read or cooked, or User A may have fallen asleep halfway through Movie X while Movie X continued to play. In another example, User B may have left his or her television on to entertain a dog while User B was out of the house. Thus, simply knowing how long or how often a media item has been played does not necessarily give insight into how engaged users were with the media item. In another example, a large group of people may be gathered in one location, such as a bar, a restaurant, or another public venue, to watch a media item (e.g., a playoff football game); however, the broadcaster of the media item may have no way of knowing that more than one person is watching based simply on the number of devices presenting the media item.

Examples of the present disclosure use biometric technologies, such as face and eye tracking, to monitor a user's attentiveness when the user is playing a media item (e.g., streaming a movie, a television show, a podcast, or the like). More particularly, examples of the present disclosure use an algorithmic process to identify a number of individuals present in a location where a media item is being played. Each individual's facial and/or eye movements may be tracked using cameras or other sensors in the location. Machine learning techniques (e.g., support vector machine, convolutional neural networks, linear regression, logistic regression, naïve Bayes, random forest, and/or other techniques) may be employed to analyze these facial and/or eye movements and to detect when the facial and/or eye movements indicate that one or more of the individuals are no longer paying attention to the media item. The algorithmic process may assign a score to each individual indicating each individual's level of engagement or attentiveness over the course of playback of the media item, and these individual scores may be combined to generate an overall audience score. The audience score may be made available to the creator and/or distributor of the media item in order to allow the creator and/or distributor to better understand the true level of audience engagement with the media item.

In further examples, when it is determined that one or more audience members are no longer paying attention to a media item, the algorithmic process may initiate one or more actions in response to the determination. For instance, playback of the media item may be paused, or a marker may be inserted into the media item to indicate the point at which the audience ceased paying attention. This may allow automatic playback of the media item to be resumed from the point at which the audience ceased paying attention, without the audience having to search arbitrarily for portions of the media item that look familiar and potentially spoiling portions of the media item that were previously not missed. Further examples of the present disclosure may be implemented in parental control features, so that when an individual who appears to be or is known to be below a certain age is detected, playback of media items having content ratings above a threshold is disabled or paused. These and other aspects of the present disclosure are discussed in greater detail in connection with FIGS. 1-3, below.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, Internet of Things (IoT) device 170, and so forth, with one another and with various other devices via a core network 110, a wireless access network 150 (e.g., a cellular network), an access network 120, other networks 140 and/or the Internet 145.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable smart device (e.g., a smart watch or fitness tracker, a pair of smart glasses or goggles, etc.), a gaming console, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP)

telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an engagement server 115 (e.g., an application server). For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113, advertising server 117, and engagement server 115 to select which video programs, or other content and advertisements to provide to the home network 160 and to others.

In one example, content servers 113 may store scheduled television broadcast content for a number of television channels, video-on-demand programming, local programming content, gaming content, and so forth. The content servers 113 may also store other types of media that are not audio/video in nature, such as audio-only media (e.g., music, audio books, podcasts, or the like) or video-only media (e.g., image slideshows). For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160 and at other downstream viewing locations. For example, advertisers may upload various advertising content to the core network 110 to be distributed to various viewers.

In one example, the engagement server 115 may determine a number of individuals who are present in a location where a media item is being presented and may monitor the engagement of those individuals with the media item. In one example, the engagement server 115 may receive sensor data from one or more sensors that are present in the location where the media item is being presented. For instance, if the media item is being presented on TV 163A in home network 160, the engagement server may receive sensor data from one or more sensors within detection range of the TV 163A. In one example, the one or more sensors may include cameras (e.g., RGB cameras, infrared cameras, still cameras, video cameras, etc.). The cameras may be integrated into one or more of the mobile devices 167A and 167B, and home network devices such as home gateway 161, set-top boxes (STBs) 162A, and 162B, television (TV) 163A and TV 163B, home phone 164, router 165, personal computer (PC) 166, IoT device 170. For instance, TV 163A may include an integrated camera or an Internet-connected camera that is mounted on or near the TV 163A. In another example, IoT device 170 may comprise a portion of a camera-based home security system. In another example, mobile devices 167A and 167B may comprise smart phones that include integrated cameras. Any of these cameras may provide series of images to the engagement server 115 for analysis.

Based on analysis of the series of images (or other sensor data) provided, the engagement server 115 may detect a number of individuals present in the location where the media item is being presented. For instance, the engagement server 115 may use facial or image recognition techniques to detect the number of individuals. In a further example, facial recognition techniques could be used to identify one or more of the individuals, which may allow the engagement server 115 to retrieve profiles for the identified individual(s) to make the presentation of the media item more personalized, as described in greater detail below.

The engagement server 115 may further utilize facial recognition techniques to identify specific facial features of the individuals in the series of images and to track movements of those facial features across the series of images. For instance, the engagement server 115 may locate, for each detected individual, the individual's eyes and mouth. The engagement server 115 may then track the movements of the individual's eyes and mouth over a subset of the series of images that spans a defined time period (e.g., x seconds, y minutes, etc.). Any detected movements of facial features may be correlated, using machine learning, to infer an alertness score for the individual that indicates how engaged the individual is with the media item. Further details as to how the alertness score is calculated are discussed in connection with FIG. 2, below.

In one example, when the engagement server 115 detects that a calculated alertness score for an individual falls below a predefined threshold, the engagement server 115 may take action on the media item to improve the individual's engagement with the media item. For instance, the engagement server 115 may pause playback of the media item, insert a marker into the media item (or into a user profile associated with the individual) to indicate a point at which the individual's engagement with the media item fell below the predefined threshold, or the like.

In a further example, the engagement server 115 may calculate an overall alertness score for an individual with respect to the media item. The overall engagement score may comprise an aggregation of alertness scores that were calculated for the individual over discrete segments of time during playback of the media item. The overall alertness score may reflect the individual's engagement with the media item as a whole (e.g., rather than with specific portions of the media item). In further examples, an audience alertness score may be calculated as an aggregation of the overall engagement scores for a plurality of individuals who are present in the location where the media item is being presented. The audience alertness score may reflect the audience's engagement with the media item as a whole (although the engagement of a plurality of individuals with discrete segments of the media item may also be calculated from the individuals' alertness scores for those discrete segments as well). Any of the alertness scores may be detailed in a report that the engagement server 115 may generate and provide to creators and/or distributors of media content.

In one example the engagement server 115 may store user profiles for a plurality of users. In one example, the profile for a user may store settings to facilitate assessment of the user's engagement with the media item. For instance, the profile may store baseline settings or examples for indicating when the user is likely engaged or not engaged. As an example, the profile may indicate that the user has a vision impairment (e.g., amblyopia) that may affect the user's eye movements or that the user frequently sings along when watching movie musicals. In a further example, the profile may include parental control settings associated with the user (e.g., such that when the user is detected in the location where a media item is being presented, playback of any media item having higher than a threshold content rating is prevented). In a further example, the profile may indicate actions that the user authorizes the engagement server 115 to take when the user is determined to not be engaged with a media item that is being presented (e.g., pause playback, insert a marker, etc.). In another example, the profile may include a user-defined configurable alertness score representing a minimum level of engagement below which the user authorizes the engagement server 115 to take action on the media item.

Figure 3:
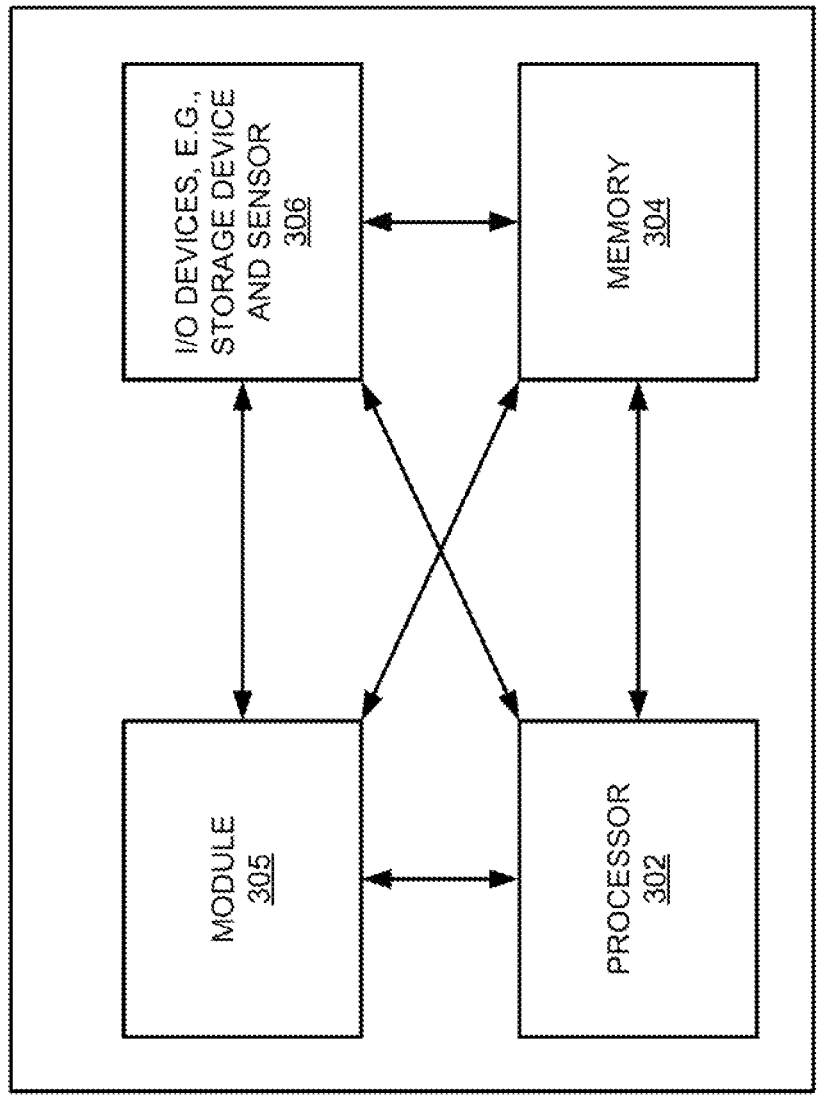
FIG. 3 depicts a high-level block diagram of a computing device specifically programmed to perform the functions described herein.

In one example, any or all of the television servers 112, content servers 113, application servers 114, engagement server 115, and advertising server 117 may comprise a computing system, such as computing system 300 depicted in FIG. 3.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A and 167B, IoT device 170, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
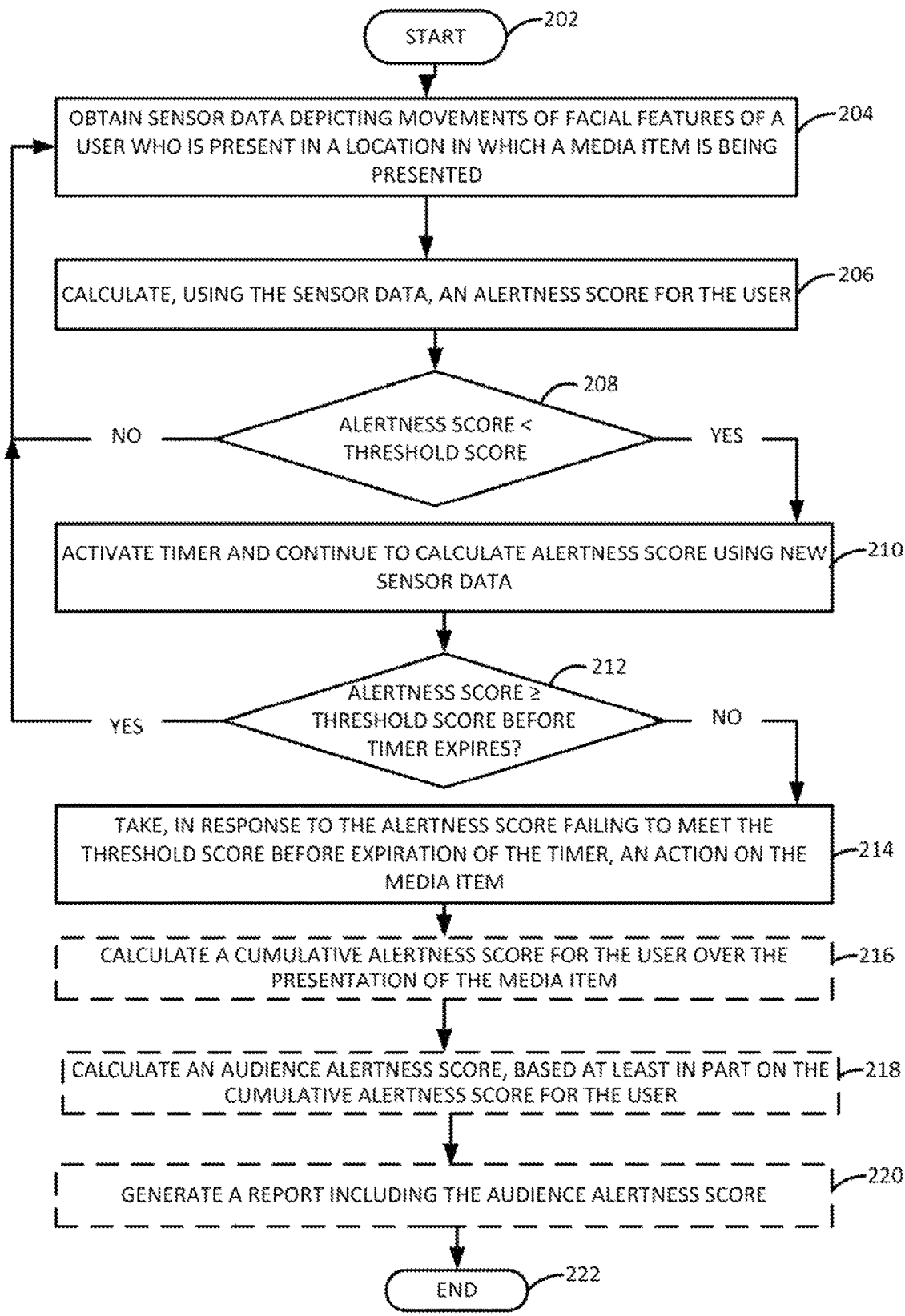
FIG. 2 illustrates a flowchart of an example method for quantifying user engagement with a media item that is being presented, in accordance with the present disclosure.

To further aid in understanding the present disclosure, FIG. 2 illustrates a flowchart of an example method 200 for quantifying user engagement with a media item that is being presented, in accordance with the present disclosure. In one example, the method 200 may be performed by an application server that is configured to quantify user engagement with a media item that is being presented, such as the engagement server 115 illustrated in FIG. 1. However, in other examples, the method 200 may be performed by another device, such as the processor 302 of the system 300 illustrated in FIG. 3. For the sake of example, the method 200 is described as being performed by a processing system.

The method 200 begins in step 202. In step 204, the processing system may obtain sensor data depicting movements of facial features of a user who is present in a location in which a media item is being presented.

In one example, the media item may be presented over a streaming media platform. For instance, as discussed above, the media item may comprise a video stream (e.g., a movie or a television show), an audio stream (e.g., music, a podcast, or an audio book) or the like. Playback of the media item may be started and stopped by the user at any time using controls that are built into the streaming media platform (e.g., using a remote control, voice control, or other means).

In one example, the facial features of the user whose movements are depicted in the sensor data may include the user's eyes, mouth, and/or other facial features. For instance, the movements of the user's eyes may include a rate of blinking (e.g., number of blinks per unit of time), lengths of blinks (e.g., quick blinks versus slow blinks), a length of time for which the user's eyes are closed, a direction of the user's gaze (e.g., whether the user's eyes are gazing at a television screen or somewhere else, such as at a phone, a book, or another person), and/or other eye movements. The movements of the user's mouth may include movements that indicate that the user is talking, laughing, frowning, or the like.

In one example, the movements of the facial features may be recorded using sensors which are present in the location in which the media item is being presented. For instance, in one example the sensors may include cameras (e.g., RGB cameras, infrared cameras, still cameras, video cameras, and/or other types of cameras). In one example, the sensors may be integrated into the user endpoint device on which the media item is being played. For instance, if the user is streaming a movie or a podcast on his or her tablet computer, the tablet computer may include a built in camera that can record the movements of the user's facial features as a stream of images and deliver that stream of images to the processing system for analysis. In another example, the sensors may be part of one or more other user endpoint devices or IoT devices that are present in the location. For instance, the media item may be played on a television in a room that includes one or more video cameras as part of a home security system, and the video cameras may deliver video streams of the user in the room to the processing system for analysis.

In one example, the user may opt in to monitoring by the sensors in accordance with the method 200. For instance, user permission may be required before the sensors may begin collecting and transmitting information that can be used to track the movements of the user's facial features.

In one example, the user may be one of a plurality of users who are present at the location in which the media item is being presented. For instance, the user may be watching a movie with a group of friends or with their family. In this case, the sensor data may depict movements of the facial features of all of the users in the plurality of users (or of a subset of the plurality of users who are within detection range of the sensors, such as within the field of view of a camera).

In step 206, the processing system may calculate, using the sensor data, an alertness score for the user. In one example, the alertness score utilizes machine learning techniques to predict how engaged the user is with the media item, depending on the movements of the user's facial features.

In one example, playback of a media item may occur over a time period denoted as $t_w$, where $t_w$ may span the entire duration of the media item or may span a time period that is shorter than the entire duration of the media item (e.g., the user may actively stop playback of the media item before the media item plays to completion, or playback of the media item may be automatically paused before the media item plays to completion in response to determining a decrease in user engagement, as described below). The time period $t_w$ may be broken down into n predefined segments of time $t_s$, where each segment $t_s$ is shorter than $t_w$. For instance, $t_w$ may span more than one hour, while each segment $t_s$ may span one minute. In one example, each of the n segments $t_s$ may have the same duration; however, in other examples, at least two segments $t_s$ of the n segments $t_s$ have different durations.

For the $i^{th}$ segment of time $t_s^i$, the alertness score for the user may be calculated as:

$$\frac{(t_s^i - t_\Delta^i)}{t_s^i} \in [0, 1] \qquad \text{(EQN. 1)}$$

where $t_\Delta$ represents an amount of time for which a user is determined to be not engaged with the media item (e.g., based on analysis of the movements of the user's facial features) and $t_\Delta^i$ represents the amount of time for which the user is determined to be not engaged with the media item during the $i^{th}$ segment of time.

In one example, the user may be determined to be not engaged with the media item based on movements of the facial features of the user corresponding to one or more known patterns of movement that indicate a lack of engagement. For instance, in one example, the user's eyes may be closed (e.g., potentially indicating that the user has fallen asleep, or at least is not watching the media item if the media item includes a video component), and $t_\Delta^i$ may indicate an amount of time for which the user's eyes are closed during the $i^{th}$ segment of time. In another example, the user's gaze may be directed to a location other than the media item (e.g., other than a display on which the media item is being played, if the media item includes a video component), and $t_\Delta^i$ may indicate an amount of time for which the user's gaze is directed to the location other than the media item during the $i^{th}$ segment of time. In another example, the user's eyelids may start to droop (e.g., potentially indicating that the user is getting drowsy), and $t_\Delta^i$ may indicate an amount of time for which the user's eyelids drooped during the $i^{th}$ segment of time. In another example, the first the user's lips may be moving (e.g., potentially indicating that the user is talking and is not focused on the media item), and $t_\Delta^i$ may indicate an amount of time for which the user's lips were moving during the $i^{th}$ segment of time. In another example, $t_\Delta^i$ may indicate an amount of time during which a combination of two or more of the above movements of the user's facial features are detected. For instance, $t_\Delta^i$ may indicate an amount of time for which the user's lips are moving and the user is looking at another individual rather than at a television on which a media item (e.g., a movie) is being played.

In one example, the movements of the facial features of the user may be detected using image or facial analysis techniques. For instance, any known image or facial analysis technique or combination of image and facial analysis techniques may be used to locate the facial features of the user within a series of images and to track the movements of the facial features across the series of images.

In a further example, determining whether the movements of the facial features of the user indicate lack of engagement may include identifying the user as part of the analysis. For instance, facial recognition techniques may be utilized to analyze images of the user which are received in real time from the sensors (i.e., as the media item is being presented) and to compare the images of the user to stored images of known users in order to infer an identity (e.g., name, account, user identifier, or the like) of the user. In one example, identification of the user may enable the processing system to retrieve a profile of the user, where the profile may store settings to facilitate assessment of the user's engagement with the media item. For instance, the profile may store baseline settings or examples for indicating when the user is likely engaged or not engaged. As an example, the profile may indicate that the user has a vision impairment (e.g., amblyopia) that may affect the user's eye movements or that the user frequently sings along when watching movie musicals. Thus, eye movements that might indicate lack of engagement for other users might not necessarily indicate lack of engagement for the identified user. Similarly, lip movements that might be inferred to indicate talking for other users might simply indicate that the identified user is singing along with (and is thus highly engaged with) the media item when the media item is a movie musical.

As another example, the profile may indicate the user's age, which may be used to enforce parental controls as discussed in further detail below. In a further example described in further detail below, the profile may also indicate actions that the user authorizes the processing system to take when the user is determined to not be engaged with a media item that is being presented.

In step 208, the processing system may determine whether the alertness score falls below a predefined threshold alertness score. In one example, the threshold alertness score may be a configurable alertness score that may be set by the creator of the media item or by the distributor (e.g., streaming media platform) of the media item. For instance, the threshold alertness score may represent a minimum level of user engagement that an advertiser wants the distributor to guarantee when the advertiser is paying a specified amount of money to place advertisements during playback of the media item. In another example, the threshold alertness score may be a configurable alertness score that may be set by the user (e.g., in a user profile). For instance the threshold alertness score may represent a minimum level of engagement below which the user authorizes the processing system to take action on the media item (e.g., as described in further detail below).

If the processing system determines in step 208 that the alertness score does not fall below the predefined threshold alertness score, then the method 200 may return to step 204, and the processing system may continue to obtain sensor data depicting movements of facial features of the user as described above. If, however, the processing system determines in step 208 that the alertness score does fall below the predefined threshold alertness score, then the method 200 may proceed to step 210.

In step 210, the processing system may start, in response to determining that the alertness score has fallen below the predefined threshold alertness score, a timer while continuing to calculate the alertness score for the user using newly obtained sensor data. The timer may count down a predetermined period of time (e.g., x seconds or y minutes). The predetermined period of time may be configured to allow the processing system to determine whether the below-threshold alertness score of the user represents a short term state of the user or a long term state of the user.

For instance, the user may have dozed off for a short period of time during one segment of time for which the alertness score was calculated, but subsequently awakened during the next segment of time for which the alertness score was calculated. Alternatively, the user may have been talking to another individual who is present in the location (e.g., a person who temporarily walked into a room in which the media item is being presented) during one segment of time for which the alertness score was calculated, but may no longer be talking to the other individual during the next segment of time for which the alertness score was calculated (e.g., the other individual may have left the room or sat down to experience the media item with the user).

In step 212, the processing system may determine whether the alertness score for the user is detected to meet or exceed the predefined threshold alertness score before expiration of the timer. In other words, as the timer counts down the predetermined period of time, the processing system will monitor the alertness scores that are calculated for each passing segment of time as the media item continues to be presented and will determine if, during any of the passing segments of time, the alertness score met or exceeded the threshold alertness score (indicating that the user may once again be engaged with the media item). Or, put another way, in step 212 the processing system determines whether the user's lack of engagement with the media item (as determined based on the below-threshold alertness score detected in step 208) persists for longer than the predetermined period of time counted down by the counter.

If the processing system concludes in step 212 that an alertness score for the user that meets or exceeds the threshold alertness score has been detected before expiration of the timer, then the method 200 may return to step 204, and the processing system may continue to obtain sensor data depicting movements of facial features of the user as described above. The processing system may also pause or reset the timer before returning to step 204.

If, however, the processing system determines in step 212 that an alertness score (e.g., broadly an updated alertness score using sensor data after the start of the timer) for the user that meets or exceeds the threshold alertness score has not been detected before expiration of the timer, then the method 200 may proceed to step 214.

In step 214, the processing system may take, in response to the alertness score for the user failing to meet the predefined threshold score before the expiration of the timer, an action associated with the media item. In one example, the action is designed to improve the user's engagement with the media item either currently or at a later time.

For instance, in one example, the action associated with the media item may comprise pausing playback of the media item. In one example, before pausing the playback of the media item, the processing system may solicit the user's permission to pause the playback. For instance, the processing system may display or play a dialog that asks the user whether playback should be paused, and then pauses (or does not pause) the playback in response to the user's answer to the dialog. In one example, the dialog may be associated with a dialog timer, such that if the dialog timer expires before the user provides an answer to the dialog, then the playback of the media item is paused by default (e.g., the assumption being that if the user does not even respond to the dialog, then the user is most likely not engaged).

In another example, rather than pause the playback, the processing system may simply insert a marker into the media item, where the marker indicates a place in the media item (e.g., a time stamp or a frame number) corresponding to the detection of the alertness score that fell below the threshold alertness score. For instance, if the alertness score that fell below the threshold alertness score is detected at a time that frame f in the media item is being presented, then the marker may be inserted at frame f (or a predefined number of frames or seconds before frame f, e.g., frame f-10 and so on). In another example, the marker may be stored in a profile for the user rather than in the media item itself. In this case, the marker that is stored in the profile (e.g., a particular time within the played media item such as 40 minutes after the movie started and so on) may also indicate the media item (e.g., a title of the media item) to which the marker refers. The marker thus provides a way for the user to easily locate the place in the media item at which his or her engagement decreased, in case the user wishes to resume playback of the media item at a later time.

In another example, where the segment(s) of time $t_s$ corresponding to the below threshold alertness score(s) corresponds to advertising (e.g., commercials), the processing system may change the advertising. For instance, if the user does not appear to be interested in a first commercial, then the processing system may stop presenting the first commercial (e.g., before the first commercial completes playback) and start presenting a second commercial. The second commercial may advertise a different product or service than the first commercial, may feature a different spokesperson (e.g., a different celebrity) than the first commercial, may have a different tone than the first commercial, and/or may differ from the first commercial in some other way.

In optional step 216 (illustrated in phantom), the processing system may calculate a cumulative alertness score for the user over the presentation of the media item. The cumulative alertness score may represent the user's level of engagement with the media item as a whole, as opposed to the user's level of engagement with any one or more particular segments of time $t_s$ within the media item.

In one example, the cumulative alertness score for the user is calculated over the time period $t_w$ over which playback of a media item occurred may be calculated as:

$$\frac{\sum_{i=0}^{n} (t_s^i - t_\Delta^i)}{t_w} \in [0, 1] \quad \text{(EQN. 2)}$$

In optional step 218 (illustrated in phantom), the processing system may calculate an audience alertness score, based at least in part on the cumulative alertness score for the user. In one example, the audience alertness score represents the overall engagement with the media item of all individuals who are present in the location (or at least all individuals who are detected in the location) in which the item is being presented. If the user is the only individual who is present or detected in the location, then the audience alertness score may be equal to the cumulative alertness score for the user, as calculated in step 216. If the user is one of a plurality of individuals who are present or detected in the location, then the audience alertness score may be calculated as an aggregation of a plurality of cumulative alertness scores, where each cumulative alertness score of the plurality of cumulative alertness scores quantifies the engagement of one individual of the plurality of individuals with the media item over the time period $t_w$ over which playback of the media item may occurred (e.g., where all cumulative alertness scores of the plurality of cumulative alertness scores are calculated in accordance with EQN. 2, above).

In one example, the aggregation may comprise an average of all of the cumulative alertness scores of the plurality of cumulative alertness scores (i.e., by summing all of the cumulative alertness scores of the plurality of cumulative alertness scores and dividing by the number of individuals for whom the cumulative alertness scores of the plurality of cumulative alertness scores were calculated). In one example, cumulative alertness scores that are considered outliers may be ignored in the aggregation.

For instance, in one example, cumulative alertness scores for individuals whose engagement with the media item is considered to be sparse may be discarded. In one example, an individual's engagement with a media item may be considered to be sparse if the percentage of segments of time $t_s$ for which the individual's alert score was zero is greater than or equal to a predefined threshold (where the predefined threshold may be configurable). As an example, if the predefined threshold is fifty percent, then an example of an alertness score that reflects "sparse" engagement may resemble:

[0.00, 0.00, 0.03, 0.00, 0.01, 0.02, 0.00, 0.00, 0.00, 0.00, 0.05, 0.00, 0.00, 0.00, 0.00, 0.00, 0.01, 0.01, 0.01, 0.00], where each value within the above row vector represents the alertness score calculated for an individual during one segment of time $t_s$. In this case, the percentage of segments of time $t_s$ for which the individual's alert score was zero is sixty-five percent, which is greater than the predefined threshold of fifty percent.

In optional step 220 (illustrated in phantom), the processing system may generate a report including the audience alertness score. In one example, the report may be formatted in human readable form for ease of review by a creator and/or distributor of the media item. In one example, the report may provide a greater level of granularity with respect to user engagement with the media item. For instance, in addition to the audience alertness score, the report may include cumulative alertness scores for groups of individuals who share some demographic (e.g., if demographic information is available in the user profiles of those individuals). For instance, the report may analyze audience alertness scores for a plurality of audiences having different compositions (i.e., different membership), and may aggregate the cumulative alertness scores for groups of users across the plurality of audiences who share various demographics (e.g., women, men, under twenty years of age, over 60 years of age, residing in urban areas, residing in rural areas, etc.). In another example, the report may rank segments of time $t_s$ of the media item according to some aggregation of the alertness scores across the plurality of audiences.

The method 200 may end in step 222. However, it should be noted that the steps 204-216 of the method 200 may be repeated for each user who is detected in the location in which the media item is being presented (where the cumulative alertness scores for all of the users who are detected in the location in which the media item is being presented may be aggregated in step 218). Moreover, steps 204-220 may be repeated for each different media item that is presented in the location.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

Thus, examples of the present disclosure leverage biometric technologies, such as face and eye tracking, to more accurately quantify the engagement of users with media items. The improved data collection and analytics that can be achieved may help creators of media items and operators of platforms through which media items are distributed (e.g., streaming media platforms) to better tailor their content to increase subscriber engagement and retention. The improved data collection and analytics could also be used to tailor features to improve the subscriber experience. These features may include, for instance, content recommendation systems (which could be enhanced through better understanding of content feedback and might include systems that recommend advertising as well as entertainment), features that allow for pause or marking of media items when user engagement decreases, and/or other features. This may make it easier for a user to locate a portion of a media item during which the user fell asleep, for instance. This may also avoid the unnecessary consumption of network bandwidth, power, and other resources through streaming of a media item that a user is no longer paying attention to.

Moreover, the improved data collection and analytics may allow the platform operators' to provide a greater level of detail to advertisers who are looking for the best placements for their advertisements (e.g., the placements that will provide the greatest return on investment). For instance, conventional systems may leverage household and device level identifiers sourced from vendors, partners, and other internal platforms to build engagement metrics. However, the sourced user data is vulnerable to assumptions based on preconceived notions. As an example, a conventional approach might assume that a user who resides in a rural area and frequently watches politically conservative-leaning news channels may be more receptive to what are considered "alternative" forms of medicine. Such a user might thus be presented with advertisements from a local alternative medicine practitioner during commercial breaks on the new channels. However, this assumption may be incorrect. According to examples of the present disclosure, data analytics may more easily and more accurately identify which types of content draw the user's attention.

Examples of the present disclosure may also provide more accurate counts of user reach, engagement, and impressions. For instance, as discussed above, a user may play a media item on a television that no one is actively watching (e.g., to distract a lonely pet in an empty home). Conversely, a large number of people may be gathered to watch a media item on a single device (e.g., in a public space such as a bar or restaurant). In both cases, it is difficult to accurately gauge the number of individuals who are actively paying attention to the media item, since conventional analytics account only for the number of devices on which playback is occurring. However, the use of biometrics to track users' facial features allows examples of the present disclosure to also accurately determine the number of users who are present and engaged (or not engaged).

In further examples still, examples of the present disclosure could be utilized to improve subscriber account security. For instance, by tracking the facial features of the users who are present in a location where a media item is being presented, examples of the present disclosure may be able to detect when the users who are present in the location are not authorized for presentation of the media item. For instance, a child for whom the parents have authorized viewing of videos rated Y-7 or under may be detected in the location where a media item that is rated TV-MA is being presented. Similarly, an individual who is not the subscriber may be detected trying to access the subscriber's account (e.g., the individual who is not the subscriber may have obtained the subscriber's account login information through illegal means, or the subscriber may be sharing their account login information against a service provider's terms of service).

Although examples of the present disclosure are discussed within the context of media, and especially streaming media, it will be appreciated that the examples disclosed herein could be applied to other fields of use as well. For instance, examples of the present disclosure could be applied to the field of remote learning. In this case, the engagement of students with a remotely presented lesson could be monitored and quantified. The engagement information could be used by instructors to better gauge student understanding and participation. Similar approaches could be used to gauge participation in virtual meetings in a professional setting. Still other examples of the present disclosure could be applied to the field of live events, such as comedy shows, concerts, and the like. In this case, better understanding of audience engagement could allow performers to adapt their performances in real time (e.g., to cut short a particular line of jokes for which audience engagement is low, to replace a new song in a set list with an older hit when the audience is more engaged with older songs, etc.).

FIG. 3 depicts a high-level block diagram of a computing device specifically programmed to perform the functions described herein. For example, any one or more components or devices illustrated in FIG. 1 or described in connection with the method 200 may be implemented as the system 300. For instance, an application server (such as might be used to perform the method 200) could be implemented as illustrated in FIG. 3.

As depicted in FIG. 3, the system 300 comprises a hardware processor element 302, a memory 304, a module 305 for quantifying user engagement with a media item that is being presented, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for quantifying user engagement with a media item that is being presented may include circuitry and/or logic for performing special purpose functions relating to monitoring and quantifying user engagement with a media item based on movements of user facial features. The input/output devices 306 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for quantifying user engagement with a media item that is being presented (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for quantifying user engagement with a media item that is being presented (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
obtaining, by a processing system, sensor data depicting movements of facial features of a user who is present in a location in which a media item is being presented;
calculating, by the processing system using the sensor data, an alertness score for the user;
determining, by the processing system, that the alertness score falls below a predefined threshold alertness score, wherein playback of the media item occurs over a time period $t_w$, wherein the time period $t_w$ comprises n predefined segments of time $t_s$, wherein each segment of time $t_s$ of the n predefined segments of time $t_s$ is shorter than $t_w$, and wherein for an $i^{th}$ segment of time $t_s^i$ of the n predefined segments of time $t_s$, the alertness score is calculated as $$\frac{(t_s^i - t_\Delta^i)}{t_s^i} \in [0, 1],$$

wherein $t_\Delta$ is an amount of time for which the user is determined to be not engaged with the media item and $t_\Delta^i$ is an amount of time for which the user is determined to be not engaged with the media item during the $i^{th}$ segment of time $t_s^i$;
starting, by the processing system in response to the determining that the alertness score falls below the predefined threshold alertness score, a timer while continuing to calculate the alertness score for the user using newly obtained sensor data;
determining, by the processing system, that the alertness score for the user using the newly obtained sensor data has failed to meet the predefined threshold alertness score before an expiration of the timer; and
taking, by the processing system in response to the alertness score for the user using the newly obtained sensor data failing to meet the predefined threshold score before the expiration of the timer, an action associated with the media item.

2. The method of claim 1, wherein the facial features of the user comprise at least one of: eyes of the user or a mouth of the user.

3. The method of claim 2, wherein the sensor data comprises a series of images, and the series of images is captured by at least one camera that is located in the location in which the media item is being presented.

4. The method of claim 3, wherein the user has consented to being monitored by the at least one camera while the media item is being presented.

5. The method of claim 1, wherein the user is determined to be not engaged with the media item when movements of the facial features of the user correspond to a known pattern of movement that indicates a lack of engagement.

6. The method of claim 5, wherein the known pattern of movement comprises eyes of the user being closed.

7. The method of claim 5, wherein the known pattern of movement comprises a gaze of the user being directed at something other than a device on which the media item is being presented.

8. The method of claim 5, wherein the known pattern of movement comprises a mouth of the user moving.

9. The method of claim 1, further comprising:
calculating, by the processing system, a cumulative alertness score for the user over the time period $t_w$ over which playback of the media item occurs.

10. The method of claim 9, wherein the cumulative alertness score is calculated as $$\frac{\sum_{i=0}^{n}(t_s^i - t_\Delta^i)}{t_w} \in [0, 1].$$

11. The method of claim 10, wherein the user is one of a plurality of individuals who are detected as being present in the location in which the media item is being presented.

12. The method of claim 11, further comprising:
calculating, by the processing system, an audience alertness score for the plurality of individuals over the time period $t_w$ over which playback of the media item occurs, based at least in part on the cumulative alertness score for the user.

13. The method of claim 12, wherein the calculating the audience alertness score comprises aggregating the cumulative alertness score for the user with respective cumulative alertness scores for the plurality of individuals.

14. The method of claim 12, further comprising:
generating, by the processing system, a report including the audience alertness score.

15. The method of claim 1, wherein the action comprises pausing the media item.

16. The method of claim 1, wherein the action comprises inserting a marker into the media item to mark a place in the media item corresponding to a time at which the alertness score was first determined to fall below the predefined threshold alertness score.

17. The method of claim 1, wherein the action comprises inserting a marker into a profile of the user to mark a place in the media item corresponding to a time at which the alertness score was first determined to fall below the predefined threshold alertness score.

18. A non-transitory computer-readable medium storing instructions which, when executed by a processor, cause the processor to perform operations, the operations comprising:
obtaining sensor data depicting movements of facial features of a user who is present in a location in which a media item is being presented;
calculating, using the sensor data, an alertness score for the user;
determining that the alertness score falls below a predefined threshold alertness score, wherein playback of the media item occurs over a time period $t_w$, wherein the time period $t_w$ comprises n predefined segments of time $t_s$, wherein each segment of time $t_s$ of the n predefined segments of time $t_s$ is shorter than $t_w$, and wherein for an $i^{th}$ segment of time $t_s^i$ of the n predefined segments of time $t_s$, the alertness score is calculated as $$\frac{(t_s^i - t_\Delta^i)}{t_s^i} \in [0, 1],$$

wherein $t_\Delta$ is an amount of time for which the user is determined to be not engaged with the media item and $t_\Delta^i$ is an amount of time for which the user is determined to be not engaged with the media item during the $i^{th}$ segment of time $t_s^i$;
starting, in response to the determining that the alertness score falls below the predefined threshold alertness score, a timer while continuing to calculate the alertness score for the user using newly obtained sensor data;
determining that the alertness score for the user using the newly obtained sensor data has failed to meet the predefined threshold alertness score before an expiration of the timer; and
taking, in response to the alertness score for the user using the newly obtained sensor data failing to meet the predefined threshold score before the expiration of the timer, an action associated with the media item.

19. A device comprising:
a processor; and
a computer-readable medium storing instructions which, when executed by the processor, cause the processor to perform operations, the operations comprising:
obtaining sensor data depicting movements of facial features of a user who is present in a location in which a media item is being presented;
calculating, using the sensor data, an alertness score for the user;
determining that the alertness score falls below a predefined threshold alertness score, wherein playback of the media item occurs over a time period $t_w$, wherein the time period $t_w$ comprises n predefined segments of time $t_s$, wherein each segment of time $t_s$ of the n predefined segments of time $t_s$ is shorter than $t_w$, and wherein for an $i^{th}$ segment of time $t_s^i$ of the n predefined segments of time $t_s$, the alertness score is calculated as $$\frac{(t_s^i - t_\Delta^i)}{t_s^i} \in [0, 1],$$

wherein $t_\Delta$ is an amount of time for which the user is determined to be not engaged with the media item and $t_\Delta^i$ is an amount of time for which the user is determined to be not engaged with the media item during the $i^{th}$ segment of time $t_s^i$;
starting, in response to the determining that the alertness score falls below the predefined threshold alertness score, a timer while continuing to calculate the alertness score for the user using newly obtained sensor data;
determining that the alertness score for the user using the newly obtained sensor data has failed to meet the predefined threshold alertness score before an expiration of the timer; and
taking, in response to the alertness score for the user using the newly obtained sensor data failing to meet the predefined threshold score before the expiration of the timer, an action associated with the media item.

20. The device of claim 19, wherein the facial features of the user comprise at least one of: eyes of the user or a mouth of the user.

* * * * *